US010337737B2

(12) United States Patent
Holdcraft et al.

(10) Patent No.: US 10,337,737 B2
(45) Date of Patent: Jul. 2, 2019

(54) COMBUSTOR TILE

(71) Applicant: Rolls-Royce Corporation, Indianapolis, IN (US)

(72) Inventors: John D. Holdcraft, Carmel, IN (US); Jack D. Petty, Sr., Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 352 days.

(21) Appl. No.: 15/197,130

(22) Filed: Jun. 29, 2016

(65) Prior Publication Data

US 2017/0003026 A1  Jan. 5, 2017

Related U.S. Application Data

(60) Provisional application No. 62/186,651, filed on Jun. 30, 2015.

(51) Int. Cl.
*F23R 3/00* (2006.01)
*F23R 3/06* (2006.01)
*F23R 3/50* (2006.01)

(52) U.S. Cl.
CPC .............. *F23R 3/002* (2013.01); *F23R 3/007* (2013.01); *F23R 3/06* (2013.01); *F23R 3/50* (2013.01); *F23R 2900/03041* (2013.01); *F23R 2900/03042* (2013.01); *F23R 2900/03043* (2013.01); *F23R 2900/03044* (2013.01); *Y02T 50/675* (2013.01)

(58) Field of Classification Search
CPC .. F23R 3/002; F23R 3/007; F23R 3/06; F23R 3/50; F23R 3/60; F23R 2900/03041; F23R 2900/03042; F23R 2900/03044
See application file for complete search history.

(56) References Cited

U.S. PATENT DOCUMENTS

| 5,435,139 | A | * | 7/1995 | Pidcock | F23R 3/002 |
| | | | | | 60/752 |
| 6,183,199 | B1 | * | 2/2001 | Beeck | F01D 5/186 |
| | | | | | 416/97 R |
| 6,383,602 | B1 | * | 5/2002 | Fric | F01D 5/186 |
| | | | | | 428/131 |
| 7,374,401 | B2 | * | 5/2008 | Lee | F01D 5/18 |
| | | | | | 415/115 |
| 7,631,502 | B2 | | 12/2009 | Burd et al. | |
| 7,997,868 | B1 | * | 8/2011 | Liang | F01D 5/186 |
| | | | | | 416/97 R |
| 8,056,342 | B2 | * | 11/2011 | Shelley | F23R 3/06 |
| | | | | | 60/752 |
| 8,057,181 | B1 | * | 11/2011 | Liang | F01D 5/186 |
| | | | | | 416/97 R |

(Continued)

OTHER PUBLICATIONS

European Search Report dated Nov. 22, 2016 issued on EP Patent Application No. 16176643.1.

*Primary Examiner* — Todd E Manahan
*Assistant Examiner* — Eric W Linderman
(74) *Attorney, Agent, or Firm* — Fishman Stewart PLLC

(57) ABSTRACT

A gas turbine engine includes a combustor having a combustor tile assembly with improved cooling air flow channels and enhanced cooling efficiency. A method of manufacturing same is provided which increases production capabilities and the geometric configurations of the exit ports which in turn improve the hot side operating temperature of the tiles in the combustion chamber.

18 Claims, 4 Drawing Sheets

(56) References Cited

U.S. PATENT DOCUMENTS

| | | | | |
|---|---|---|---|---|
| 8,066,484 B1* | 11/2011 | Liang | F01D 5/186 | 415/115 |
| 8,092,176 B2* | 1/2012 | Liang | F01D 5/186 | 416/231 R |
| 8,359,866 B2 | 1/2013 | Dierberger et al. | | |
| 8,572,983 B2* | 11/2013 | Xu | F01D 5/186 | 60/752 |
| 8,616,004 B2 | 12/2013 | Zupanc et al. | | |
| 9,010,124 B2* | 4/2015 | Chandler | F23R 3/002 | 60/752 |
| 9,587,832 B2* | 3/2017 | Dierberger | F23R 3/002 | |
| 10,030,524 B2* | 7/2018 | Rhodes | F01D 5/186 | |
| 10,030,525 B2* | 7/2018 | Bergholz | F23R 3/002 | |
| 2002/0090295 A1* | 7/2002 | Torii | F01D 5/186 | 415/115 |
| 2006/0005543 A1* | 1/2006 | Burd | F23M 5/085 | 60/752 |
| 2006/0059916 A1* | 3/2006 | Cheung | F23R 3/00 | 60/752 |
| 2007/0169484 A1* | 7/2007 | Schumacher | F23R 3/002 | 60/754 |
| 2007/0209366 A1* | 9/2007 | Gerendas | F23R 3/002 | 60/752 |
| 2007/0227149 A1* | 10/2007 | Biebel | F23R 3/06 | 60/752 |
| 2007/0283700 A1* | 12/2007 | Gerendas | F23R 3/002 | 60/754 |
| 2008/0264065 A1* | 10/2008 | Gerendas | F23R 3/002 | 60/754 |
| 2009/0169394 A1* | 7/2009 | Crow | B23H 9/10 | 416/96 R |
| 2010/0011775 A1* | 1/2010 | Garry | C23C 4/02 | 60/752 |
| 2011/0016874 A1* | 1/2011 | Chandler | F23R 3/002 | 60/772 |
| 2011/0023495 A1* | 2/2011 | Bronson | F23R 3/06 | 60/752 |
| 2011/0185739 A1 | 8/2011 | Bronson et al. | | |
| 2012/0051941 A1* | 3/2012 | Bunker | F01D 5/186 | 416/97 R |
| 2012/0275900 A1 | 11/2012 | Snider et al. | | |
| 2013/0175015 A1* | 7/2013 | Tanaka | F01D 5/186 | 165/168 |
| 2013/0205786 A1* | 8/2013 | Kohli | F01D 5/186 | 60/722 |
| 2013/0205787 A1* | 8/2013 | Zelesky | F01D 5/186 | 60/722 |
| 2013/0205790 A1* | 8/2013 | Xu | F01D 5/186 | 60/754 |
| 2013/0205792 A1* | 8/2013 | Gleiner | F23R 3/06 | 60/754 |
| 2013/0205794 A1* | 8/2013 | Xu | F01D 5/186 | 60/754 |
| 2013/0205802 A1* | 8/2013 | Levasseur | F01D 5/186 | 60/806 |
| 2013/0209227 A1* | 8/2013 | Xu | F01D 5/186 | 415/115 |
| 2013/0209234 A1* | 8/2013 | Xu | F23R 3/06 | 415/116 |
| 2013/0209235 A1* | 8/2013 | Xu | F01D 5/186 | 415/116 |
| 2013/0209236 A1* | 8/2013 | Xu | F01D 5/186 | 415/116 |
| 2013/0255265 A1* | 10/2013 | Rudrapatna | F23R 3/06 | 60/754 |
| 2014/0020393 A1* | 1/2014 | Nakamata | F23R 3/002 | 60/754 |
| 2014/0150436 A1 | 6/2014 | Eroglu et al. | | |
| 2014/0216042 A1 | 8/2014 | Hanson | | |
| 2014/0219815 A1* | 8/2014 | Kohli | F01D 5/18 | 416/97 R |
| 2014/0238030 A1* | 8/2014 | Gerendas | F23R 3/002 | 60/754 |
| 2014/0338347 A1* | 11/2014 | Gage | F23R 3/06 | 60/754 |
| 2015/0027127 A1* | 1/2015 | Clemen | F23R 3/002 | 60/752 |
| 2015/0159871 A1* | 6/2015 | Pearson | F23R 3/06 | 60/754 |
| 2015/0377033 A1* | 12/2015 | Xu | F01D 11/08 | 60/755 |
| 2016/0008889 A1* | 1/2016 | Xu | F01D 5/186 | 219/76.12 |
| 2016/0010473 A1* | 1/2016 | Spangler | F01D 5/186 | 415/177 |
| 2016/0061451 A1* | 3/2016 | Dudebout | F23R 3/06 | 60/806 |
| 2016/0069192 A1* | 3/2016 | Tanaka | B23H 9/10 | 416/97 A |
| 2016/0097285 A1* | 4/2016 | Harding | F01D 5/186 | 60/752 |
| 2016/0097325 A1* | 4/2016 | Harding | F01D 5/186 | 60/752 |
| 2016/0123156 A1* | 5/2016 | Hucker | F01D 5/186 | 60/806 |
| 2016/0186626 A1* | 6/2016 | Bunker | F01N 3/043 | 60/39.5 |
| 2016/0201469 A1* | 7/2016 | Lewis | F01D 5/081 | 415/115 |
| 2016/0251966 A1* | 9/2016 | Bunker | F01D 5/145 | 416/97 R |
| 2016/0273363 A1* | 9/2016 | Bunker | F01D 9/065 | |
| 2016/0273364 A1* | 9/2016 | Bergholz | F23R 3/002 | |
| 2016/0312619 A1* | 10/2016 | Thornton | F01D 5/186 | |
| 2016/0356498 A1* | 12/2016 | Gerendas | F01D 5/186 | |
| 2017/0176006 A1* | 6/2017 | Gerendas | F23R 3/002 | |
| 2017/0261208 A1* | 9/2017 | Starkweather | B23K 20/12 | |
| 2017/0292707 A1* | 10/2017 | Tsunoda | F02C 7/18 | |
| 2018/0135520 A1* | 5/2018 | Lewis | F01D 9/023 | |

\* cited by examiner

COMBUSTOR TILE

CROSS-REFERENCE TO RELATED APPLICATIONS

This application is a non-provisional application claiming priority to U.S. Provisional Application No. 62/186,651 filed Jun. 30, 2015, which is hereby incorporated by reference in its entirety.

FIELD OF TECHNOLOGY

A gas turbine engine uses a combustor and a combustor liner, and more particularly, a liner and method of manufacturing wherein wall elements form an improved cooling system.

BACKGROUND

Gas turbine engines are used extensively in high performance aircraft and they employ fans, compressors, combustors and turbines and during operation they generate energies and air flows that impact the performance of the engine's systems. A gas turbine may employ one or more combustors that serve as the fuel preparation and ignition chambers for generating the temperature rise which is required to drive the turbine blades. Typical combustors may use inner and outer liners that define an annular combustion chamber in which the fuel and air mixtures are combusted. The inner and outer liners are radially offset from the combustor casings such that inner and outer passage ways are defined between the respective inner and outer liners and casings.

In order to improve the thrust and fuel consumption of gas turbine engines, i.e., the thermal efficiency, it is necessary to use high compressor exit pressures and combustion exit temperatures. Higher compressor pressures also give rise to higher compressor exit temperatures supplied to the combustion chamber, which results in a combustor chamber experiencing much higher temperatures than are present in most conventional combustor designs.

A need exists to provide effective cooling of the combustion chamber walls. Various cooling methods have been proposed including the provision of a doubled walled combustion chamber whereby cooling air is directed into a gap between spaced outer and inner walls, thus cooling the inner wall. This air is then exhausted into the combustion chamber through apertures in the inner wall. The inner wall may be comprised of a number of heat resistant tiles.

Combustion chamber walls which comprise two or more layers are advantageous in that they only require a relatively small flow of air to achieve adequate wall cooling. However, hot spots may form in certain areas of the combustion chamber wall. This problem is heightened as temperatures within the combustion chamber which can exceed 3,500 degrees F. Such harsh environmental conditions may prematurely reduce the life of the liner of the combustor. In addition, loss of tile attachment and subsequent component distress remains an engineering challenge in current combustor technology.

Providing enhanced air cooling flow could help minimize hot spots and the overall performance of the combustor. Accordingly, it would be helpful to provide an improved combustor tile system and method of manufacturing same.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A gas turbine engine combustor tile design includes an exemplary high temperature capable dual wall combustor tile attached to a lower temperature capable cold skin of a combustor liner. The wall cooling is accomplished by feeding cooling air through holes in the cold skin. The cooling air impinges on the back side of the hot tile and then flows out ejection slots or holes into the combustor flow path. The trajectory of the cooling air out of the ejection slots impacts film cooling effectiveness. An improved ejection slot angle trajectory and exit opening is provided which permits reattachment of the exited cooled air to the hot surface of the tile. The shape of the exit hole of the ejection slot may be modified to various shapes to decrease the velocity of the air exiting the ejection slots, thus enhancing film cooling effectiveness.

An exemplary method of manufacturing a combustor is provided which results in increased film cooling effectiveness. Such method of manufacture includes machining ejection slots in the hot skin side of the tile that are not normal to the centerline of the combustor. Methods could also include shaping holes through machining processes that provide ejection slot exit hole configurations that are, for example, fanned shaped, conical shaped, partial conical shapes, and other geometric configurations. One exemplary style of manufacturing could employ DLD (direct laser deposition) processes for generating these unique configurations. Said shapes can be manufactured in a single manufacturing process where the ejection slot and exit port configuration are generated.

Figure 1:
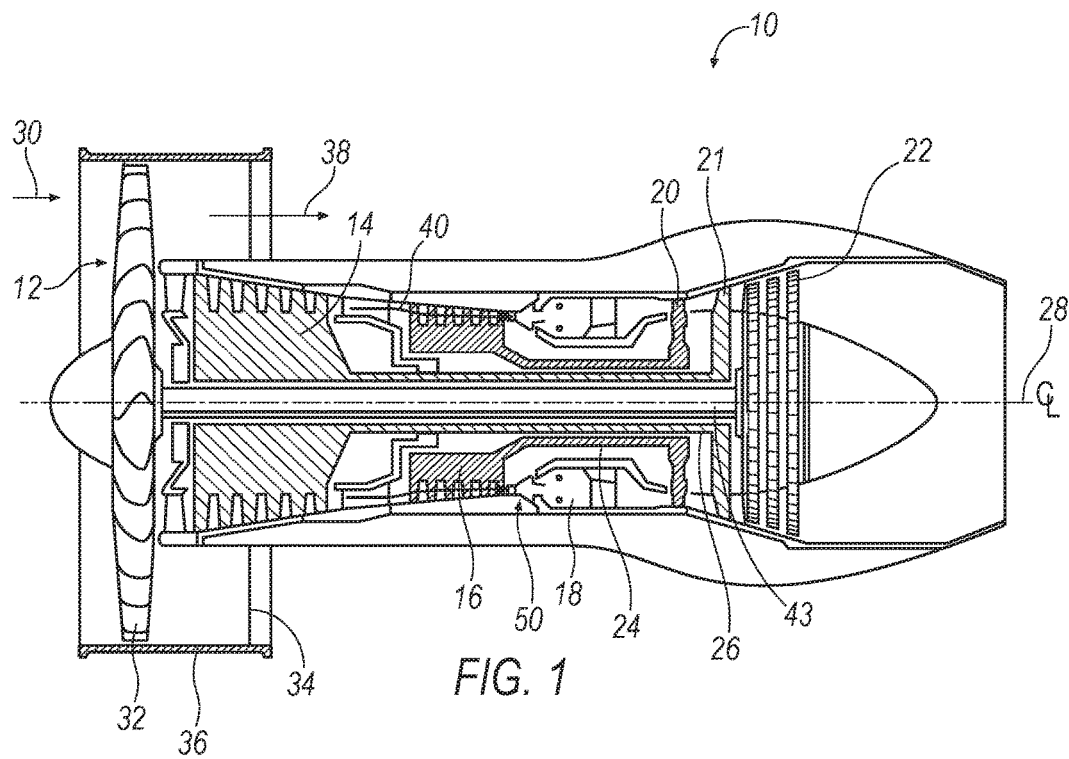
FIG. 1 illustrates a schematic diagram of a gas turbine engine employing an improved combustor tile assembly.

FIG. 1 illustrates a gas turbine engine 10, which includes a fan 12, a low pressure compressor and a high pressure compressor, 14 and 16, a combustor 18, and a high pressure turbine, intermediate pressure, and low pressure turbine, 20 thru 22, respectively. The high pressure compressor 16 is connected to a first rotor shaft 24, the low pressure compressor 14 is connected to a second rotor shaft 26, and the fan 12 is connected to a third rotor shaft 43. The shafts extend axially and are parallel to a longitudinal center line axis 28. It will be appreciated that the improvements disclosed herein can be used with gas turbine engines that incorporate a single or two-shaft architecture.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the compressors 14 and 16, combustor 18, and the turbines 20 thru 22. Thus airflow of the gas stream 40 traverses fore to aft through the compressors and in to the combustor 18. The gas turbine engine 10 includes an improved combustor 18 having a tile system or assembly 42, the details of the exemplary design are set forth herein. An improved method of manufacturing the assembly 42 is also contemplated.

Figure 2:
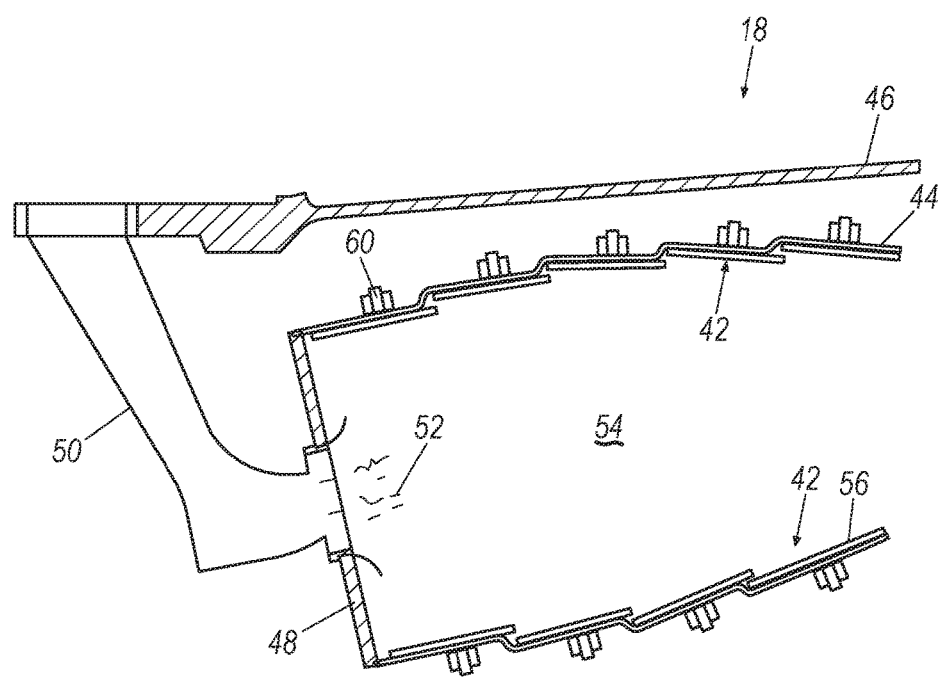
FIG. 2 illustrates a side sectional view of a gas turbine engine with an improved tiled combustor assembly.

FIG. 2 illustrates a side sectional view of the combustor 18 with a plurality of tile assemblies 42 that are secured to a cold skin or outer surface of a liner 44. A combustor outer case 46 circumscribes a combustor shell 48 and a fuel nozzle 50 provides pressurized fuel 52 to a combustor chamber 54. The combusted fuel may be ignited by an igniter (not shown) which in turn subjects the chamber 54 to elevated temperatures which can exceed 3,500 degrees F. Such arrangement causes extreme temperatures to impinge upon the hot surface 56 of each tile assembly 42. A fastener 60 or other mechanism secures each tile assembly 42 to the liner 44 of the combustor 18. It will be appreciated that an alternative attachment mechanism may be employed to secure the tiles to the liner 44. The tile assembly 42 is serviceable and may be replaced when it is damaged or is otherwise sufficiently depleted in performance quality.

Figure 3:
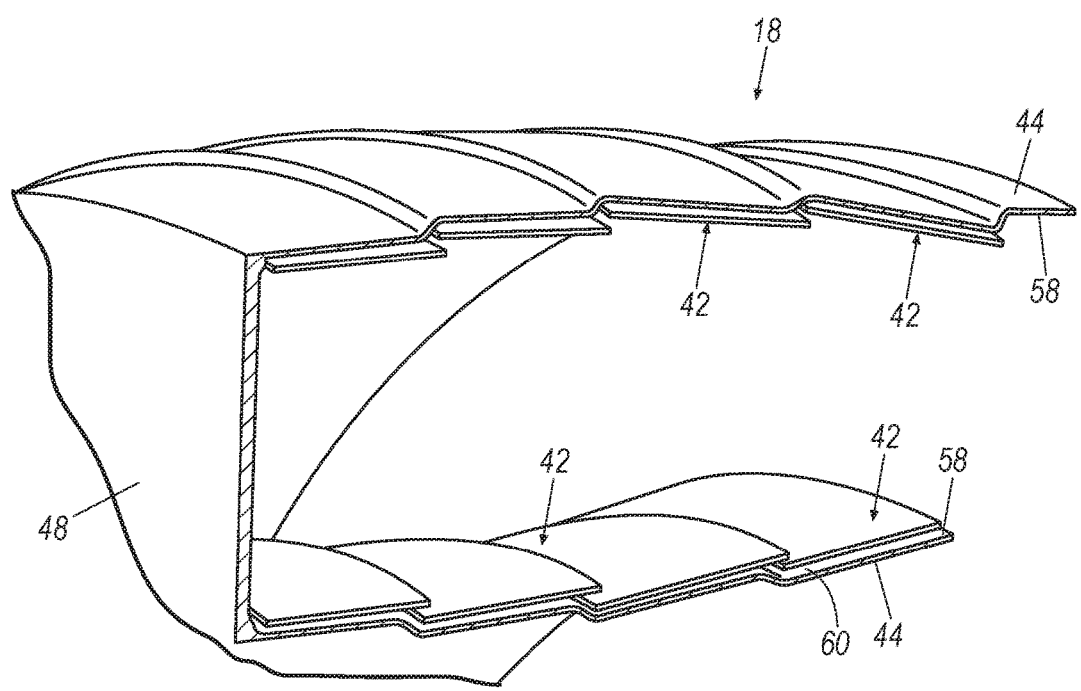
FIG. 3 illustrates a perspective view of a shell of a combustor having a tiled combustor assembly.

FIG. 3 illustrates the shell 48 of the combustor 18 having a plurality of tile assemblies 42 spaced apart and secured to the inner surface 58 of the skin 44. The inner surface 58 is protected by the tile assembly 42 at substantially the entire inner surface 58 of the skin 44. A gap 60 is maintained between the inner surface 58 and the assembly 42. The cooling effectiveness of each dual wall tile assembly 42 does not rely on accurately maintaining the gap 60 between the tile standoff features and the cold skin 44, as is the case for conventional tiles. The tile attachment feature or fastener 60 will be maintained at a lower temperature as compared to a conventional tile system. This arrangement results in a robust mechanical attachment that resists creep and loss of preload, both of which translate into improved component reliability/durability and reduced parasitic leakage. Parasitic leakage which bypasses the cooling circuit translates into lower overall cooling effectiveness.

Reduced combustor wall cooling translates into a competitive advantage in term of combustor pattern factor control, radial temperature profile control, efficiency, and emissions reduction. The integral dual wall metallic combustor tile assembly 42 offers significant advantages over conventional tiles including but not limited to a reduction in wall cooling flow, a cooler tile attachment (improved reliability/durability), reduced tile leakage and the associated penalty in cooling effectiveness due to leakage, and a more robust mechanical design in terms of less sensitivity to cold skin and tile geometric tolerances/operating deflections.

Figure 4:
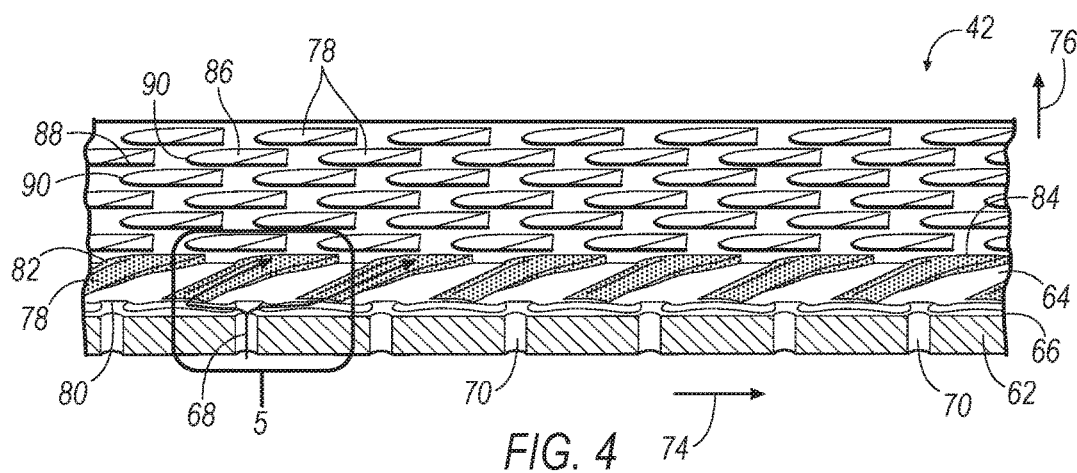
FIG. 4 illustrates a partial perspective view of the layers of one tile that is shown in the combustor assembly of FIG. 3.

FIG. 4 illustrates a perspective view of one portion of a tile assembly 42 that is shown in FIG. 3. Here the tile assembly 42 includes a cold skin 62 and a hot skin 64 that may be manufactured from CMC or metal or a combination of these materials. The skins are spaced apart from one another by an air gap 66 that extends axially and is sandwiched between the cold skin 62 and the hot skin 64. The air gap 66 provides an airflow path 68 for passing cooled fluid such as air through the tile assembly 42 and into the combustor chamber 54.

The cold skin 62 includes a plurality of normally extending inlet ports 70 that are spaced apart from one another and they extend along the axial length of each tile in the combustor 18. The number of inlet ports 70 may be based on the desired air flow volume considerations that may be appropriate for the demands of the engine 10. The ports 70 are oriented substantially normal to the bottom surface 72 of the cold skin 62. In the section cut that is show in FIG. 4, the inlet ports 70 have been arranged such that they are offset in the axial direction, see arrow 74, as well as in the circumferential direction, see arrow 76.

The hot skin 64 includes a number of angled effusion cooling holes 78 that extend through the hot skin starting from a lower surface 80 of the hot skin 64 to a top surface 82 of the hot skin 64. Each such cooling hole 78 is oriented along or nearly along a centerline CL that is positioned at an angle φ relative to the lower surface 80 of the hot skin 64. It will be appreciated that the angle φ may be in the range of 30 degrees, however it could be more or less. An exit hole 84 of each cooling hole 78 is configured to have a unique shape so as to enhance air flow 68 as it traverses out of the cooling hole 78. By realigning the air flow 68 along a path that is closer to the top surface 84 of the hot skin 64, improved cooling can be obtained which results in increased tile and combustor performance. This in turn improves the efficiency of the engine 10.

With continued reference to FIG. 4, the exit holes 84 are stacked along and arranged axially 74 in rows along the tiles' surface 82. As an example, a first row 86 is shown having a plurality of exit holes 84 that extend axially (in the direction of arrow 74). In addition, a second row 88 is shown having a plurality of exit holes 84 that extend axially (in the direction of arrow 74). Each such row 86, 88 of exit holes 84 are offset circumferentially in the direction of arrow 76 as they extend around the circumference of the tile 42.

Each exit hole 84 has a leading edge 90 and a trailing edge 94. The exit holes 84 are offset circumferentially and axially from the adjacent exit hole. For example, the leading edge 90 for the row 86 is offset from the leading edge 90 of the row 88. This offset stacked arrangement of the leading edges of the exit holes 84 creates an improved effusive cooling arrangement.

Figure 5:
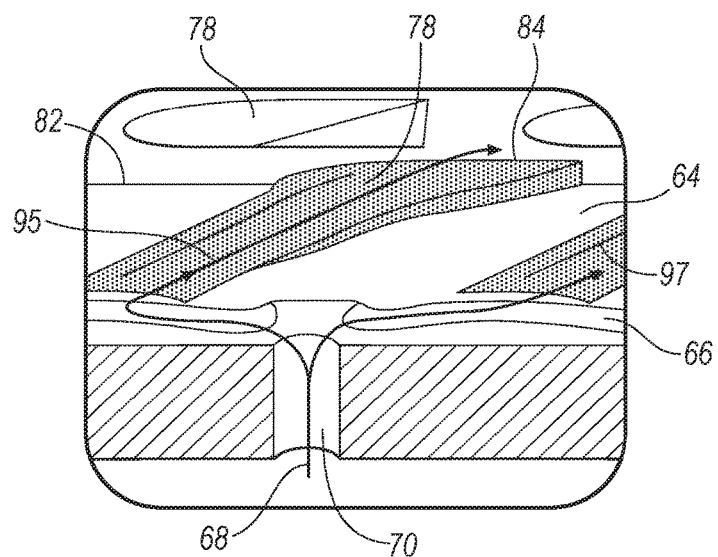
FIG. 5 illustrates an enlarged perspective view taken from circle 5 of FIG. 4, showing the layers of the tile.

FIG. 5 illustrates an enlarged view taken from circle 5 of FIG. 4. Here an enlarged section of one inlet port 70 is shown with cooled air 68 traversing into the air gap 66. Cooling air 68 then traverses into multiple pathways, for example one upstream 95 and one downstream 97. The space of the air gap 66 may vary as is desired to provide sufficient cooling volume to the hot side of the tile. As the cooling air 68 passes along path 95 it jets out of the exit holes 84 to the interior of the combustor 18. However the airflow is quickly aligned with the top surface 82 of the hot skin 64 due to the angle φ of the cooling hole 78 and due to the shape of the exit hole 84.

Figure 6:
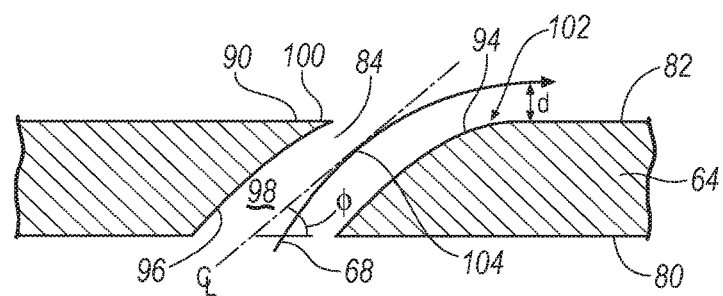
FIG. 6 illustrates an enlarged side view of a portion of the FIG. 4 tile, showing a flow path through the hot side of the tile.

FIG. 6 illustrates a side sectional view of the cooling hole 78 that is shown in the FIG. 4 tile assembly 42. The configuration of the cooling hole 78 has a passageway with inside surfaces that are arcuate shaped 96 that extend from the bottom surface 80 to the top surface 82. The leading edge 90 has a curved component with a tip 100. The trailing edge 94 is downstream from the leading edge 90 and the trailing edge 94 has an arcuate shaped surface 102 that blends into the top surface 82 of the hot skin 64. A centerline is shown with a curved and flowing component 104 that represents a potential flow path of cooling air 68 that may pass through the tile 42. At a point near the arcuate shaped surface 102 the flow of cooling air 68 is closely offset a distance from the top surface 82 of the hot skin 64. Such arrangement permits the cooled air 68 to closely traverse near to the top boundary or surface layer 160.

Figure 7:
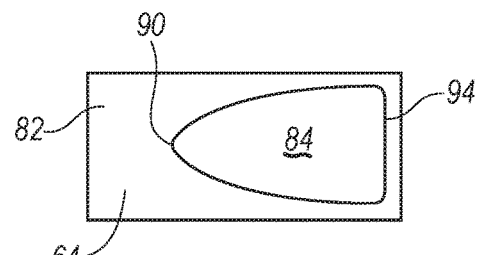
FIG. 7 illustrates a top view of the exit port of the flow path that is shown in FIG. 6.

FIG. 7 illustrates a top view of the FIG. 6 exit hole 84 relative to the top surface 82 of the hot skin 64. The leading edge 90 has a tip 100 and the surface fans towards the trailing edge 94. This arrangement is a fan type configuration. Other configurations are contemplated, such as the oval shape that is shown in FIG. 10.

Figure 8:
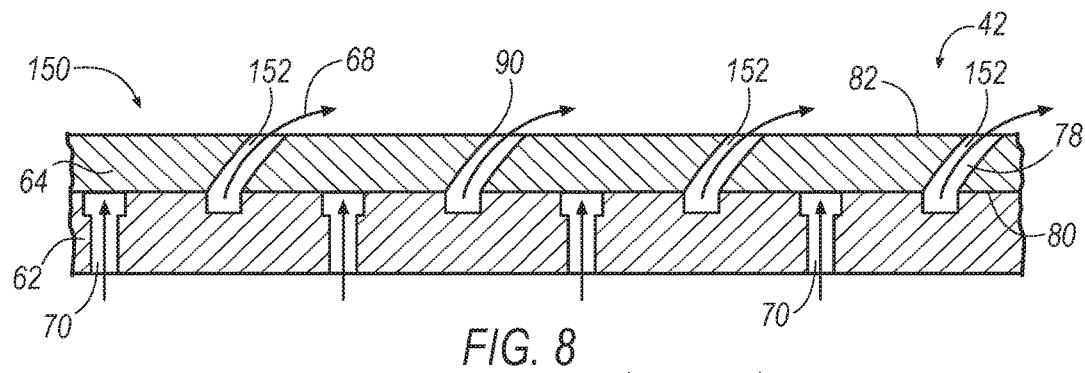
FIG. 8 illustrates a side sectional view of an alternative tile assembly showing the flow path of air over the hot surface of the combustor tile.
Figure 9:
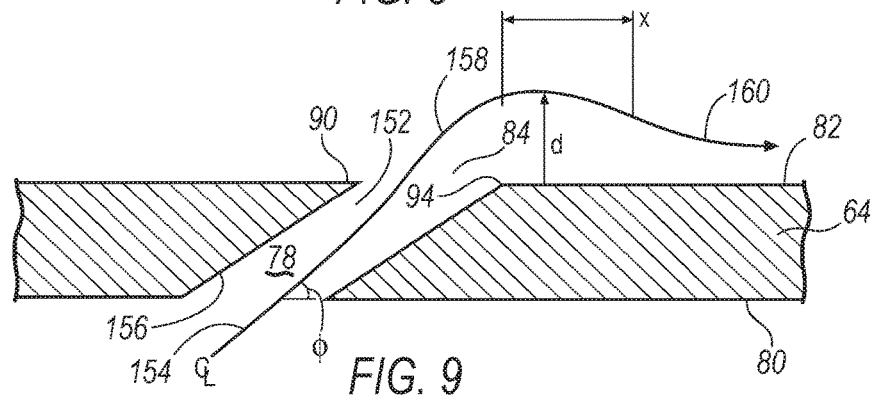
FIG. 9 illustrates an enlarged side view of a portion of the FIG. 8 tile, showing a flow path through the hot side of the tile.
Figure 10:
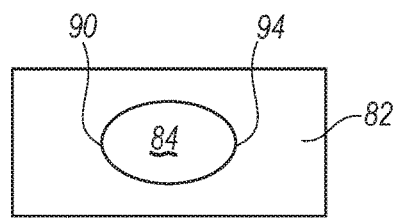
FIG. 10 illustrates a top view of the exit port of the flow path that is shown in the FIG. 9 tile assembly.

FIGS. 8-10 illustrate an alternative configuration 150 of a tile assembly 42. Here a cold skin 62 and a hot skin 64 are adjoined and include a plurality of inlet cooling ports 70 that feed air to effusion cooling ports 152. The cooling ports 152 have a centerline 154 that is straight which matches the contour of the internal walls 156 of the port 152. In the top view shown in FIG. 10 the exit port 84 is oval shaped. A leading edge 90 and trailing edge 94 represent the extreme axial positions of the exit port 84. A flow path 156 of air exits the opening and suddenly pushes away along a path 158 that is in turn offset a distance from the top surface 82 of the hot skin 64. The cooled air must travel a distance x before it reconnects to the film or surface layer 160 of the top surface. The sooner the flow path reconnects to the surface layer 160, the more effective the cooling performance of the system.

The tile assembly 42 may be constructed using various manufacturing techniques. For example, one exemplary style of manufacturing could employ DLD (direct laser deposition) processes for creating all features including the angled holes 78 and 152 in the hot skin and also the exit openings 84 on the outside surface of the hot skin. While oval shaped and fan shaped exit openings were illustrated herein, it will be appreciated that other unique shaped configurations may be employed so as to generate flow paths that are beneficial.

The tile assembly 42 may be constructed primarily of a composite ceramic material (CMC), but other configurations could include a metallic two-piece diffusion or braze bonded assembly of cast, wrought, or direct metal laser sintered (a/k/a direct laser deposition or additive manufactured) components, or a single piece cast or direct metal laser sintered tile. The tile's hot surface can either be as manufactured or can have a thermal and/or environmental barrier coating applied. The coating could be ceramic. A nut or other anchor can be provided as well so as to provide a mechanical securing mechanism for attaching each assembly 42 to the skin 44.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A gas turbine engine having a combustor comprising:
   a liner having an inner surface;
   a plurality of tile assemblies secured to the inner surface of the liner, each tile assembly of the plurality of tile assemblies having a cold layer and a hot layer that are spaced apart from one another, wherein
   the cold layer includes a plurality of ports for directing cooling air towards the hot layer, the port is oriented in a direction normal to the hot layer,
   the hot layer includes a top surface, a bottom surface, and plurality of cooling holes having an angle in the range of 30 degrees to 75 degrees relative to the top surface of the hot layer, the cooling holes have a leading edge and a trailing edge and an exit opening, the shape of the exit opening is circular in a top plan view,
   wherein at least one of: (i) the cooling hole of the hot layer has a surface that is arcuate shaped with a consistent profile from the bottom surface to the top surface, and (ii) the trailing edge of the cooling hole has a radius that smoothly blends into the top surface of the hot layer.

2. The gas turbine as claimed in claim 1, wherein the cooling hole of the hot layer has an interior surface that extends from a first side to a second side of the of the hot layer, the interior surface is curved and not linear.

3. The gas turbine as claimed in claim 1, wherein at least a portion of the tile assembly of the plurality of tile assemblies is formed of a ceramic composite material.

4. The gas turbine as claimed in claim 1, wherein the exit opening of the hot layer is fan shaped.

5. The gas turbine as claimed in claim 1, wherein the leading edge of the exit opening of the hot layer has a curved tip.

6. The gas turbine as claimed in claim 1, further comprising a fuel injector for introducing fuel into a combustion chamber of the combustor.

7. The gas turbine as claimed in claim 1, further comprising an outer casing that circumscribes the liner of the combustor.

8. The gas turbine as claimed in claim 1, wherein the cooling holes are aligned in a plurality of rows that extend axially relative to a centerline of the gas turbine engine.

9. The gas turbine as claimed in claim 1, wherein the exit opening of the hot layer in the top view is oval shaped.

10. The gas turbine as claimed in claim 8, wherein the first row of cooling holes is offset in the axial and circumferential direction relative to the plurality of rows of the plurality of cooling holes.

11. The gas turbine as claimed in claim 1, wherein the cooling holes are manufactured using the direct laser deposition process.

12. A gas turbine engine combustor comprising a plurality of tile assemblies and a liner circumscribing the plurality of tile assemblies, each of the plurality of tile assemblies having:
   a first wall element having a first port;
   a second wall element having a top surface and second port; and
   an air gap located between the first and second wall elements,
   wherein the second port is angled in a direction towards downstream airflow in a combustor, the second port has a curved trailing edge that blends smoothly into the top surface of the second wall element, and wherein at least one of: (i) the second port has a surface that is arcuate shaped with a consistent profile from a bottom surface of the second wall element to the top surface of the second wall element, and (ii) the curved trailing edge of the second port smoothly blends into the top surface of the second wall element.

13. The tile for a gas turbine engine combustor as claimed in claim 12, wherein the first port in the first wall element is directed in a direction that is normal to the top surface of the second wall element.

14. The tile for a gas turbine engine combustor as claimed in claim 12, wherein the second port in the second wall element has an exit opening, the exit opening is fan shaped in a top plan view.

15. The tile for a gas turbine engine combustor as claimed in claim 12, further comprising a flow path entering the first port, traversing the air gap to an inlet of the second port, and then exiting the second port.

16. The tile for a gas turbine engine combustor as claimed in claim 12, wherein the second port has a centerline that extends at an angle in the range of 30 to 75 degrees relative to a bottom surface of the second wall element.

17. The tile for a gas turbine engine combustor as claimed in claim 13, wherein the second port has an internal wall that is curved in a side profile view.

18. A combustor for a gas turbine engine comprising:
a tile assembly having a first layer, a second layer and a chamber between each such layer, the first layer having a port for receiving cooled air and delivering the cooled air to the chamber, the second layer having a passageway with an opening and an exit, the passageway is angled such that the exit is downstream of the opening;
a liner circumscribing the tile assembly; and
a fastener for securing the tile to the liner;
wherein at least one of: (i) the passageway has a surface that is arcuate shaped with a consistent profile from a bottom surface of the second layer to a top surface of the second layer, and (ii) a trailing edge of the passageway has a radius that smoothly blends into the top surface of the second layer.

* * * * *